(12) United States Patent
Brown et al.

(10) Patent No.: US 7,107,363 B2
(45) Date of Patent: Sep. 12, 2006

(54) MICROPROCESSOR HAVING BANDWIDTH MANAGEMENT FOR COMPUTING APPLICATIONS AND RELATED METHOD OF MANAGING BANDWIDTH ALLOCATION

(75) Inventors: Jeffrey Douglas Brown, Rochester, MN (US); Michael Norman Day, Round Rock, TX (US); Charles Ray Johns, Austin, TX (US); James Allan Kahle, Austin, TX (US); Takeshi Yamazaki, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 10/464,882

(22) Filed: Jun. 19, 2003

(65) Prior Publication Data

US 2004/0260746 A1 Dec. 23, 2004

(51) Int. Cl.
*G06F 3/00* (2006.01)
(52) U.S. Cl. ............................... 710/18; 712/10
(58) Field of Classification Search .............. 710/1, 710/18; 712/1, 10
See application file for complete search history.

(56) References Cited

U.S. PATENT DOCUMENTS

| | | | | |
|---|---|---|---|---|
| 6,662,297 B1* | 12/2003 | Boom et al. | ............... | 712/245 |
| 6,772,435 B1* | 8/2004 | Thexton et al. | ............... | 725/91 |
| 2003/0236861 A1* | 12/2003 | Johnson et al. | ............ | 709/219 |
| 2004/0019704 A1* | 1/2004 | Sano et al. | ................ | 709/252 |
| 2004/0073735 A1* | 4/2004 | Boom et al. | ............... | 710/260 |
| 2004/0215806 A1* | 10/2004 | Brenner et al. | ............. | 709/232 |

* cited by examiner

*Primary Examiner*—Fritz Fleming
*Assistant Examiner*—Harold Kim
(74) *Attorney, Agent, or Firm*—Carr LLP; Diana R. Gerhardt

(57) ABSTRACT

The present invention discloses, in one aspect, a microprocessor. In one embodiment, the microprocessor includes a processing element configured to process an application using a bandwidth. The microprocessor also includes an access shaper coupled to the processing element and configured to shape storage requests for the processing of the application. In this embodiment, the microprocessor further includes bandwidth management circuitry coupled to the access shaper and configured to track the bandwidth usage based on the requests. A method of coordinating bandwidth allocation and a processor assembly are also disclosed.

21 Claims, 3 Drawing Sheets

MICROPROCESSOR HAVING BANDWIDTH MANAGEMENT FOR COMPUTING APPLICATIONS AND RELATED METHOD OF MANAGING BANDWIDTH ALLOCATION

FIELD OF THE INVEWNTION

The present invention generally relates to microprocessors and, more specifically, to an apparatus and method for microprocessor bandwidth management

BACKGROUND OF THE INVENTION

Since the birth of the computer age, processing resources, for example, in the form of processing bandwidth, have been at the heart of application processing. Thus, each application to be processed or executed by a processing element within a computer processor requires a certain amount of allocated bandwidth within which the application is processed. As the speed of application processing continues to increase, the need for available bandwidth becomes more crucial. Moreover, as the number of applications processed increases, as processor capabilities continue to increase, the limited amount of bandwidth available for processing applications becomes in greater demand. With a constant demand by consumers for higher performing computer processors, bandwidth allocation has continued to become a problem in system architecture design.

Conventional processing systems typically have no bandwidth allocation management capabilities. During operation, each processing element independently requests storage operations (e.g., data transfer), which utilize interconnect mechanisms and the shared resources of memory and input/output (IO). Thus, in a multi-processor conventional system, the processors may overload the shared resources by occupying all of the available processing bandwidth. Such a situation ultimately limits the performance throughput capabilities of the system. Typically, in conventional systems employing such practices, the queuing systems associated with the shared resources are operated at less than 60–70% utilization to ensure that the system achieves maximum throughput during operation.

Further increasing the problem of bandwidth allocation is the distinction between the types of applications being processed. More specifically, certain applications, such as real-time applications, typically require a consistent amount of bandwidth in order to be efficiently processed. Such real-time applications may include graphic applications processed during the play of some high resolution video games on a home computer system. For peak performance, real-time applications providing the video game's graphics during play typically require a consistently available allocation of bandwidth to provide the graphics in a real-time manner. Without a relatively large amount of bandwidth available on demand and on a consistent basis, the graphics of the video game may begin to lag as game play continues. As a result, applications that are not in need of processing on a real-time basis often occupy, at inopportune times, valuable bandwidth needed by real-time applications.

Therefore, although needed by certain applications over others at particular times, the allocation of bandwidth (i.e., shared resources) in conventional processors usually occurs in an on-demand basis. As such, no priority of applications is established, allowing non-real-time applications to snatch up bandwidth based primarily on order of processing. Thus, in computer systems running programs with real-time requirements (i.e., requiring predictable and repeatable behavior), the normal variation due to queuing delays, as well as congestion due to conflicts for resources, may be overwhelmingly prohibitive. Accordingly, what is needed in the art is a processing architecture having bandwidth allocation management capabilities for avoiding the deficiencies of conventional processing architectures.

SUMMARY OF THE INVENTION o address the above-discussed deficiencies of the prior art, the present invention provides, in one aspect, a microprocessor. In one embodiment, the microprocessor includes a processing element configured to process an application using a bandwidth. The microprocessor also includes an access shaper coupled to the processing element and configured to shape storage requests for the processing of the application. In this embodiment, the microprocessor further includes bandwidth management circuitry coupled to the access shaper and configured to track the bandwidth usage based on the requests. A method of coordinating bandwidth allocation and a processor assembly are also disclosed.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiments as a basis for designing or modifying other structures for carrying out the same purposes of the present invention. Those skilled in the art should also realize that such equivalent constructions do not depart from the spirit and scope of the present invention.

BRIEF DESCRIPTION OF THE DRAWINGS

For a more complete understanding of the present invention, reference is now made to the following detailed description taken in conjunction with the accompanying drawings. It is emphasized that various features may not be drawn to scale. In fact, the dimensions of various features may be arbitrarily increased or reduced for clarity of discussion. In addition, it is emphasized that some components may not be illustrated for clarity of discussion. Reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, some details have been omitted inasmuch as such details are not considered necessary to obtain a complete understanding of the present invention, and are considered to be within the understanding of persons of ordinary skill in the relevant field of art.

Figure 1:
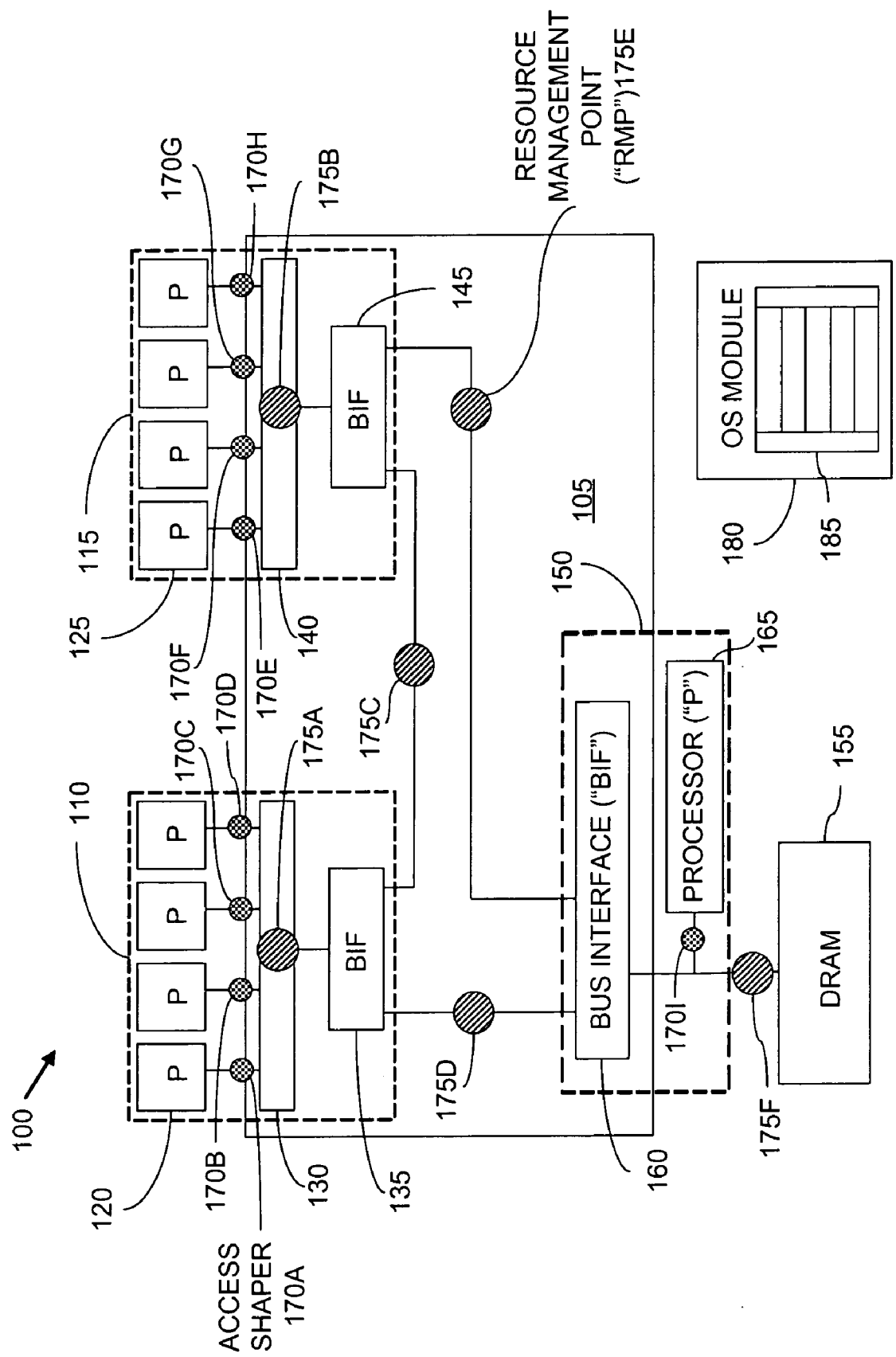
FIG. 1 illustrates one embodiment of a portion of a processor assembly having bandwidth allocation management capabilities according to the principles of the present invention.

Turning initially to FIG. 1, illustrated is one embodiment of a portion of a processor assembly 100 having bandwidth allocation management capabilities according to the principles of the present invention. The processor assembly 100 includes a chip 105 on which various portions of the processor assembly 100 are mounted. In accordance with conventional practice, the chip 105 may be constructed of a semiconductor material; however, other appropriate materials either now existing or later developed may also be employed.

Among the components mounted on the processor assembly 100 are first and second microprocessors 110, 115. As illustrated, each of the microprocessors 110, 115 are single processor chips formed on the chip 105 for performing any of a variety of computing applications. The first microprocessor 110 includes a plurality of processing elements (one of which is designated 120) arranged therein. Likewise, the second microprocessor 115 also includes a plurality of processing elements (one of which is designated 125) arranged therein. Without limitation, each of the processing elements 120, 125 may be a standard central processing unit (CPU), a streaming processor, or a DMA controller. Of course, the invention is not limited to any particular embodiment. Although only two microprocessors 110, 115 are shown in FIG. 1, those who are skilled in the relevant field of art understand that a greater number of microprocessors may be employed without deviating from the principles disclosed herein.

Each of the processing elements 120, 125 are configured to process a computing application (e.g., program threads running on a specific processing element) within a given amount of allocated bandwidth. In an exemplary embodiment, the processing elements 120, 125 process "real-time applications," where the behavior of the applications should be consistent in order to properly execute the corresponding functions, as well as other types of program threads. Examples of real-time applications include, but are not limited to, video gaming applications, process control applications, and automation and control applications.

In the first microprocessor 110, the processing elements 120 are coupled to an internal interconnect 130. As illustrated, the internal interconnect 130 is coupled to a bus interface 135, constructed of appropriate logic circuitry, and provides an interconnection between all of the processing elements 120 and the bus interface 135. Similarly, in the second microprocessor 115, the processing elements 125 are also coupled to an internal interconnect 140. Also as shown in FIG. 1, the internal interconnect 140 is coupled to a bus interface 145, and provides an interconnection between all of the processing elements 125 in the second microprocessor 115 and the bus interface 145.

In the illustrated embodiment, the bus interfaces 135, 145 provide an interconnection between the first and second microprocessors 110, 115. Such a connection allows applications to be computed that involve interaction between the first and second microprocessors 110, 115. Also as illustrated, the bus interface 135 provides an interconnection between the first microprocessor 110 and a bridge chip 150. Similarly, the bus interface 145 provides an interconnection between the second microprocessor 115 and the bridge chip 150. These connections allow data to be communicated between either or both of the first and second microprocessors 110, 115 and the bridge chip 150. Of course, other connections to the first and second microprocessors 110, 115 via the bus interfaces 135, 145 may also be provided, and the invention is not limited to interconnections with any particular components, either on or off the chip 105.

In the embodiment of the invention shown in FIG. 1, the bridge chip 150 is a memory controller employed to control access to memory modules located off the chip 105. Such memory modules include a Dynamic Random Access Memory (DRAM) module 155, as illustrated, but is not so limited. In an alternative embodiment, the bridge chip 150 may be an input/output (I/O) resource controller (not illustrated) configured to control data inputs and outputs of components mounted on the chip 105. Like the first and second microprocessors 110, 115, the interconnection of the bridge chip 150 with other components is provided via a bus interface 160. Coupled to the bus interface 160 is a single processing element 165; however, more processing elements may also be employed. Also as illustrated, the DRAM module 155 is coupled to both the bus interface 160 and the processing element 165 for employing the memory cells located in the DRAM module 155 to store and retrieve data.

Coupled to each of the processing elements 120 in the first microprocessor 110 are a plurality of corresponding access shapers 170a–170d. Coupled to each of the processing elements 125 in the second microprocessor 115 are another plurality of corresponding access shapers 170e–170h. In addition, coupled to the processing element 165 in the bridge chip 150 is yet another access shaper 170i. In accordance with the principles disclosed herein, the access shapers 170a–170i are coupled to the various processing elements 120, 125, 165 to assist in providing a bandwidth management scheme to the processing elements 120, 125, 165. More specifically, each of the access shapers 170a–170i assist in managing the allocation of the limited bandwidth available for processing applications by independently shaping the arrival profile of storage operations from each corresponding processing element's 120, 125, 165 execution of an application.

Since multiple processing elements 120, 125, 165 are continually in need of bandwidth in order to process specific program threads, bandwidth management circuitry is also implemented in the processor assembly 100, in conjunction with the access shapers 170a–170i, to govern the constant allocation of bandwidth taking place during operation. The bandwidth management circuitry interacts with the access shapers 170a–170i to process requests for bandwidth, and thus reserves bandwidth for certain processing elements 120, 125, 165, based on independent bandwidth requests made by each of the access shapers 170a–170i. In the illustrated embodiment, a portion of the bandwidth management circuitry takes the form of resource management points 175a–175f positioned at various locations on the chip 105. The resource management points 175a–175f work in conjunction with an operating system (OS) module 180, which forms another portion of the bandwidth management circuitry. Instruction code 185 written specifically for bandwidth allocation management and implemented through the OS of the computer system may be found within the OS module 180 for use in answering requests for bandwidth by reserving bandwidth or rejecting the request.

As shown in FIG. 1, the resource management points 175a–175f are positioned along data transfer paths impacted during the processing of applications. For example, a resource management point 175a is illustrated in the internal interconnect 130 to assist in bandwidth allocation among the processing elements 120 in the first microprocessor 110. Likewise, a resource management point 175b is also located in the internal interconnect 140 to assist in bandwidth allocation among the processing elements 125 in the second microprocessor 115. Furthermore, a resource management point 175c is positioned between the first and second microprocessors 110, 115 to assist in bandwidth management during the processing of applications that impact both the first and second microprocessors 110, 115. For bandwidth allocation during applications that involve either the first or second microprocessors 110, 115 with the bridge chip 150, resource management points 175d, 175e, respectively, will be utilized. Finally, a sixth resource management point 175f is illustrated interposed between the DRAM module 155 and the bus interface 160 and processing element 165 in the bridge chip 150 to assist in bandwidth management and allocation during application execution involving these components. Of course, resource management points are not limited to the locations illustrated in FIG. 1, and may be employed wherever such points would be advantageous for managing bandwidth allocation.

In function, it is the cooperation of the resource management points 175a–175f, the access shapers 170a–170i, and the code 185 within the OS module 180 that coordinates the utilization of bandwidth by each of the processing elements 120, 125, 165 along a specific data transfer path. More specifically, as each application executing on a processing element 120, 125, 165 needs bandwidth to be reserved, the application code will request a reservation for a specific amount of reserved bandwidth from the OS module 180. Each of the access shapers 170a–170i associated with the processing elements 120, 125, 165 independently ensure that the application code does not request more data transfers than the reserved bandwidth allows. The OS module 180 maintains a representation of the interconnect network topology on the chip 105, and knowledge of each resource management point 175d, 175e requiring bandwidth reservation. The OS module 180 maintains a record for each resource management point 175d, 175e, using the bandwidth management code 185, indicating the maximum bandwidth of that point that may be reserved, as well as the currently reserved bandwidth. These records are continually updated by the OS module 180 as applications are processed through the processor assembly 100.

When a request for a bandwidth reservation arrives from the application code executing on a processing element 120, 125, 165, the request contains the source node and the destination node of the data transfer path, as well as the amount of bandwidth requested. The OS module 180 determines the resource management points 175d, 175e affected by the path. If each resource management point 175d, 175e has sufficient bandwidth available to satisfy the request, the records are updated and a reservation ID is returned to the requesting application, the access shaper 170a–170i, and the processing element 120, 125, 165 on which the application thread is being executed. If one or more resource management points 175d, 175e cannot satisfy the requested bandwidth, the request is rejected by the OS module 180. Alternatively, if bandwidth has not yet been reserved for an appropriate application, and sufficient bandwidth along the necessary data transfer path is available, the OS module may then reserve the bandwidth for that application, and make it available each time the application is to be executed.

Figure 2:
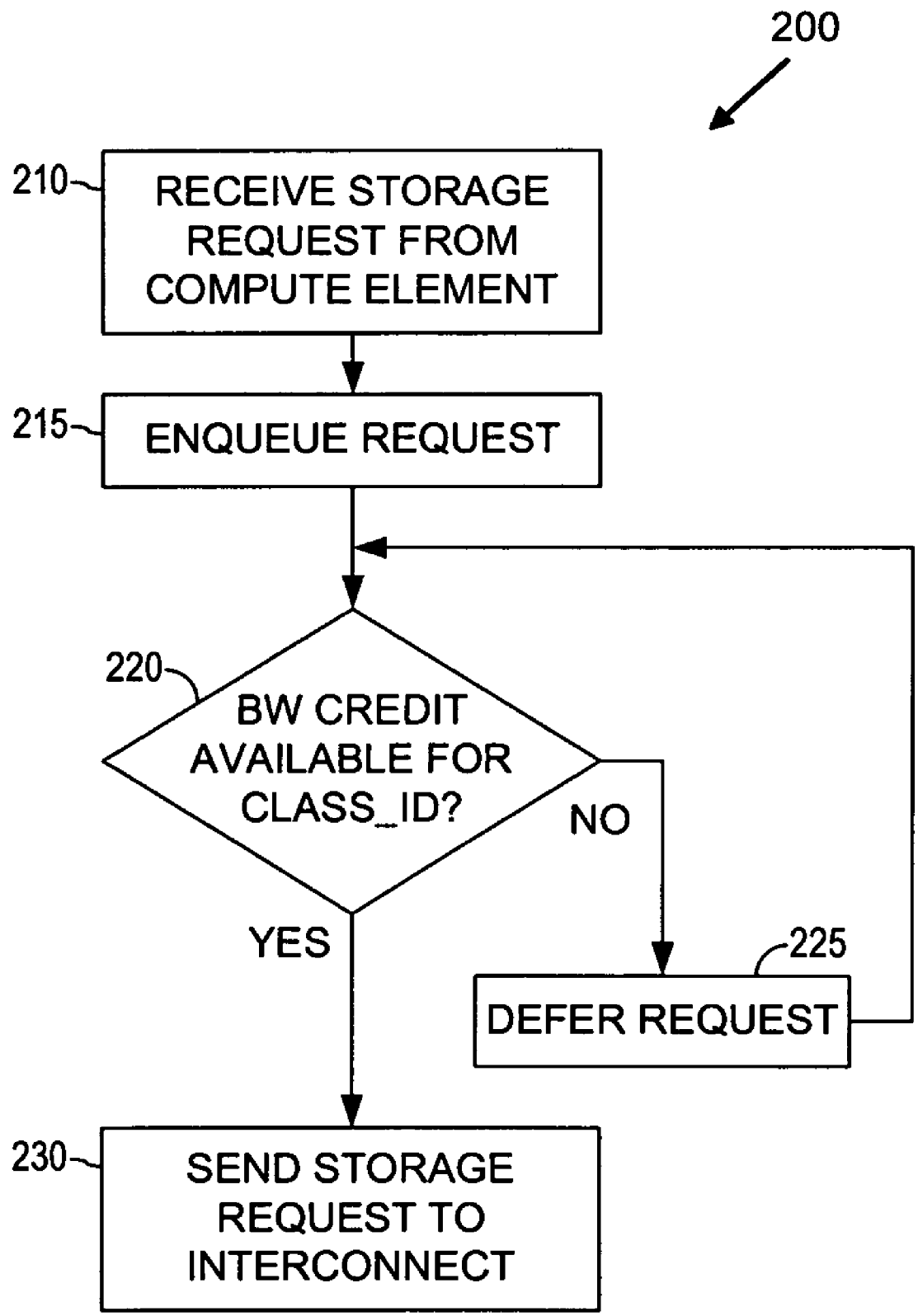
FIG. 2 illustrates a flow diagram illustrating the operational process of the access shapers shown in FIG. 1.

Looking briefly at FIG. 2, with continued reference to FIG. 1, illustrated is a flow diagram 200 illustrating the operational process of the access shapers 170a–170i shown in FIG. 1. The access shapers 170a–170i keep track of the bandwidth that has been utilized by the corresponding processing elements 120, 125, 165 for a given reservation ID 210. When a request for a certain processing element 120, 125, 165 arrives at its access shaper (170a–170i) 215, the request's reservation ID is checked against the shaper's 170a–170i bandwidth state table 220. If the requested bandwidth is available, the shaper 170a–170i allows the request to pass into the interconnect network 230. If no bandwidth is currently available, the request is deferred for processing at a later time 225.

The bandwidth management circuitry also includes a mechanism for use with the components governing bandwidth reservation and allocation to ensure that the data transfers with reserved bandwidth are given priority over opportunistic transfers without reserved bandwidth. Thus, in an embodiment where real-time applications are running along with non-real-time program threads, the reservation IDs of the real-time applications indicate a storage operation is utilizing reserved bandwidth and thus maintains priority over the opportunistic storage operations of non-real-time applications. Furthermore, the bandwidth management circuitry may also be configured to provide a mechanism for prioritizing requests among only data transfers capable of reserving bandwidth. Such priority mechanisms may advantageously increase the efficiency of the bandwidth management goals disclosed herein. However, no limitation on the means by which such priorities of requests are governed is intended.

In addition, the bandwidth management circuitry may also include a mechanism to ensure that some of the opportunistic transfers, which are not capable of reserving bandwidth, are allowed to proceed at some point. By providing bandwidth management circuitry having such capabilities, deadlock conditions (i.e., starvation) among non-priority program threads would not arise. As a result, a state of starvation of non-priority applications would not occur when bandwidth allocation priorities continue to fall with applications having reserved bandwidth.

Figure 3:
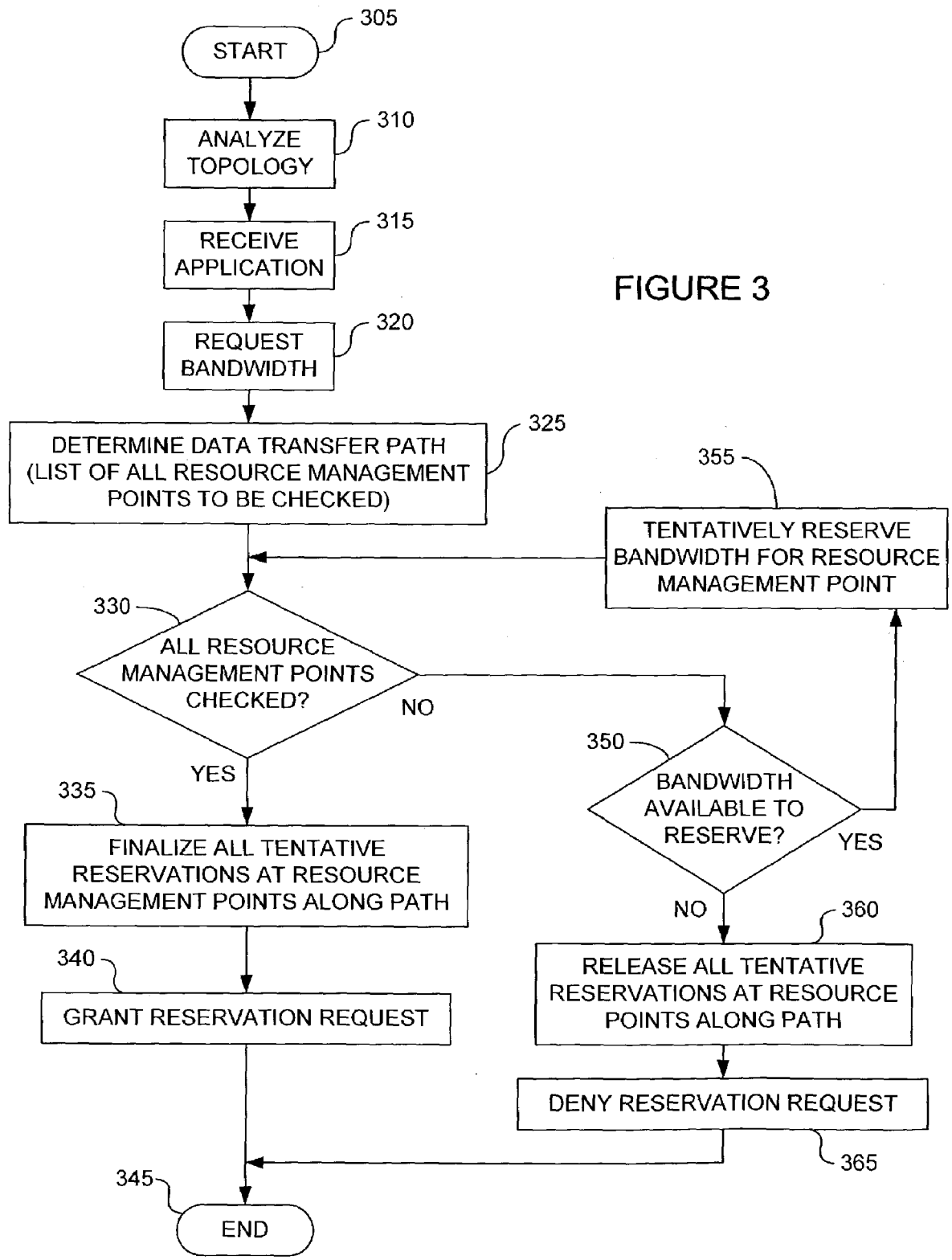
FIG. 3 illustrates a flow diagram of one embodiment of a method of coordinating bandwidth allocation within a microprocessor in accordance with the principles disclosed herein.

Turning now to FIG. 3, illustrated is a flow diagram 300 of a method of coordinating bandwidth allocation within a microprocessor in accordance with the principles disclosed herein. The flow diagram 300 begins at a start step 305. At a step 310, the topology of a chip, such as the chip 105 illustrated in FIG. 1, is analyzed by an OS module constructed according the principles discussed above. During the analyzing, the OS module determines the location of each of the resource management points across the chip. In addition, the multiple processing elements, memory elements, and access shapers would also be identified. A representation of the layout of the topology is then maintained by the OS module.

At a step 315, an application to be processed with a processing element is received. More specifically, as an application requires execution, a specific processing element and/or memory element are implicated to carry out the application. Possibilities of the applications to be executed are those capable of reserving bandwidth for processing, as well as those that are not. As mentioned above, an example of those that are capable of reserving bandwidth are real-time applications. Once the application to be processed has been received, the method proceeds to a step 320, where a request for bandwidth, within which to execute the application, is made. As discussed in detail above, the request may be made by the application requiring the reserved bandwidth. The request for bandwidth includes the source node, the destination node, and amount of bandwidth needed to execute the data transfer involved in executing the application. With the information contained in the request, the OS module may then determine the data transfer path necessary to execute the application, at a step 325. In addition, a list of all of the resource management points along the determined data transfer path is created.

Once the data transfer path has been determined, the method moves to a decision step 330, where it is determined whether all of the resource management points along the determined data transfer path have sufficient bandwidth to execute the application. If enough bandwidth is available along the path, tentative reservation of bandwidth is finalized along all of the resource management points in order to execute the application, at a step 335. Then, at a step 340, the reservation of bandwidth for the particular application is granted, and the application is executed using the reserved bandwidth. The process then moves to an end step 345.

If at step 330, it is determined that one or more of the resource management points along the determined data transfer path do not have sufficient bandwidth to execute the application, the process moves to a step 350. At step 350, it is determined, at the resource management points having insufficient bandwidth, whether bandwidth is available to be reserved for executing the application.

If, at the decision step 350, no bandwidth is available to reserve, the process moves to a step 360, where any and all tentative reservations of bandwidth along the transmission path are released. The tentative reservations are released at step 360 since bandwidth at all resource management points was not available, and thus the application could not be executed. As a result, there is no need to maintain reservations of bandwidth at only some of the resource management points, since bandwidth along the entire transmission path is needed to execute the application. Thus, the request for reservation of bandwidth is denied, at step 365, and the process would then end at step 345. The application may then start the process over again, where another attempt to find bandwidth along the transmission path may be made.

If, at the decision step 350, bandwidth is available to reserve along some of the resource management points for the particular application being executed, the process moves to a step 355 where a tentative reservation for bandwidth at that point is made. Then, the process moves back to step 330, where it is again determined whether bandwidth within all of the resource management points along the transmission path is now available. If this is determined to be the case, the process then passes to step 335, where the tentative reservation of bandwidth is finalized along all of the resource management points in order to execute the application. The reservation of bandwidth for the particular application is then granted at step 340, and the application is executed using that granted bandwidth. The process then would end at step 345.

As may be understood from the disclosure set forth above, by coordinating the efforts of instruction code in the OS module, resource management points throughout the topology of a processor chip, and the access shapers described above, in accordance with the principles of the invention discussed herein, bandwidth allocation management provides a more efficient computer processing system. More specifically, by allowing an application to reserve a specific amount of service from a specific resource, the application may be guaranteed that, if its requested load remains within its reserved amount of service, it will receive that service. The result is a processing system capable of establishing a priority of applications and allocating appropriate portions of the limited amount of bandwidth available in a processing system to applications on a priority of request basis. Moreover, such bandwidth allocation management according to the principles disclosed herein may also be configured to prevent starvation, and thus avoid deadlock of the processing system, of low priority applications not capable of reserving bandwidth. Advantageously, the principles of bandwidth management set forth herein may be implemented in almost any type of computer processor, while maintaining the benefits and advantages set forth above.

Although the present invention has been described in detail, those skilled in the art should understand that they can make various changes, substitutions and alterations herein without departing from the spirit and scope of the invention in its broadest form. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A microprocessor, comprising:
   a plurality of processing elements, each processing element configured to process an application using a bandwidth;
   a plurality of access shapers, wherein each access shaper is coupled to a single corresponding processing element, contains a state bandwidth table associated with the corresponding processing element, and is configured to:
      shape storage requests for said processing of said application; and
      use the associated state bandwidth table to track bandwidth usage for the corresponding processing element;
   a plurality of resource management points coupled to the plurality of access shapers and configured to track bandwidth usage for the corresponding access shapers; and
   bandwidth management circuitry coupled to the plurality of access shapers and the plurality of resource management points and configured to track bandwidth usage for the microprocessor based on said storage requests.

2. The microprocessor as recited in claim 1, wherein said processing element is selected from the group consisting of:
   a central processing unit (CPU);
   a streaming processor; and
   a DMA controller.

3. The microprocessor as recited in claim 1, wherein said application is a real-time application.

4. The microprocessor as recited in claim 1, wherein said bandwidth management circuitry is configured to track said bandwidth usage based on said requests by reserving said bandwidth based on said application.

5. The microprocessor as recited in claim 1, wherein said bandwidth management circuitry is further configured to prevent starvation of said application by tracking said bandwidth usage.

6. The microprocessor as recited in claim 1, wherein said microprocessor is further configured to track said bandwidth usage for the microprocessor based on priority of said requests.

7. The microprocessor as recited in claim 1, wherein said bandwidth management circuitry comprises code integrated within an operating system of a computer housing said microprocessor.

8. A method of managing bandwidth allocation within a microprocessor, comprising:
processing an application using a bandwidth with a processing element;
shaping storage requests for said processing using an access shaper uniquely coupled to said processing element;
tracking said bandwidth usage with bandwidth management circuitry distributed over a plurality of resource management points coupled to said access shaper, based on said requests;
determining if the microprocessor has sufficient bandwidth to handle the request;
if there is sufficient bandwidth, transmitting a bandwidth reservation to the processing element and the access shaper;
tracking bandwidth for the processing element by the access shaper for the storage request corresponding to the bandwidth reservation; and
executing by the processing element and the access shaper the storage request corresponding to the bandwidth reservation when bandwidth is available.

9. The method as recited in claim 8, wherein said processing an application comprises processing an application using a processing element selected from the group consisting of:
a central processing unit (CPU);
a streaming processor; and
a DMA controller.

10. The method as recited in claim 8, wherein said processing an application comprises processing a real-time application.

11. The method as recited in claim 8, wherein said tracking comprises tracking said bandwidth usage based on said requests by reserving said bandwidth based on said application.

12. The method as recited in claim 8, wherein said tracking further comprises tracking said bandwidth usage to prevent starvation of said application.

13. The method as recited in claim 8, wherein said processing an application includes processing a first application using a first bandwidth with a first processing element and said shaping includes shaping using a first access shaper coupled to said first processing element, said method further comprising processing a second application using a second bandwidth with a second processing element and shaping storage requests for said processing of said second application using a second access shaper coupled to said second processing element, and said tracking further comprising tracking said first and second bandwidth usage with bandwidth management circuitry based on priority of said requests.

14. The method as recited in claim 8, wherein said tracking comprises tracking said bandwidth usage with bandwidth management circuitry comprising code integrated within an operating system of a computer housing said microprocessor.

15. A processor assembly, comprising:
a bridge chip configured to control access to a memory element;
a plurality of microprocessors coupled to said bridge chip using a bus interface and configured to store and retrieve data in said memory element, each of said microprocessors comprising:
a plurality of processing elements coupled to an internal interconnect and configured to process corresponding applications each using a corresponding bandwidth;
a plurality of access shapers, wherein each access shaper is coupled to a corresponding processing element, contains a state bandwidth table associated with the corresponding processing element, and is configured to:
shape corresponding storage requests for said processing of said applications within said corresponding bandwidth; and
use the state bandwidth table to track said bandwidth usage for the corresponding processing element;
a plurality of resource management points coupled to the plurality of access shapers and configured to track bandwidth usage for associated access shapers; and
bandwidth management circuitry coupled to said plurality of access shapers and said plurality of resource management points and configured to track bandwidth usage for the microprocessor based on said storage requests.

16. The processor assembly as recited in claim 15, wherein each of said processing elements is selected from the group consisting of:
a central processing unit (CPU);
a streaming processor; and
a DMA controller.

17. The processor assembly as recited in claim 15, wherein each of said applications is a real-time application.

18. The processor assembly as recited in claim 15, wherein said bandwidth management circuitry is configured to allocate said corresponding bandwidths based on said requests by reserving said corresponding bandwidths based on said corresponding applications.

19. The processor assembly as recited in claim 15, wherein said bandwidth management circuitry is further configured to prevent starvation of said corresponding applications by allocating said corresponding bandwidths.

20. The processor assembly as recited in claim 15, wherein said bandwidth management circuitry comprises code integrated within an operating system of a computer housing said microprocessor.

21. A method of managing bandwidth allocation within a microprocessor containing at least two processing elements and at least two access shapers, wherein each processing element is coupled to a corresponding access shaper, comprising:
processing an application using a bandwidth with a processing element;
shaping storage requests for said processing using an access shaper uniquely coupled to said processing element;
tracking said bandwidth usage with bandwidth management circuitry distributed over a plurality of resource management points coupled to said access shaper based on the shaped storage requests, wherein the bandwidth management circuitry comprises an operating system module;
employing a priority protocol to determine if the microprocessor has sufficient bandwidth to handle the request;

if there is sufficient bandwidth, transmitting a bandwidth reservation to the processing element and the access shaper;
tracking bandwidth for the processing element by the access shaper for the storage request corresponding to the bandwidth reservation by using a state bandwidth table; and executing by the processing element and the access shaper the storage request corresponding to the bandwidth reservation when bandwidth is available; and
if there is not sufficient bandwidth, deferring the storage request for processing at a later time.

* * * * *